United States Patent
Chiang

(10) Patent No.: US 10,757,545 B2
(45) Date of Patent: Aug. 25, 2020

(54) USER CUSTOMIZABLE HANDLING OF MULTIPLE CALLS

(71) Applicant: T-Mobile USA, Inc., Bellevue, WA (US)

(72) Inventor: Hsin-Fu Henry Chiang, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 11 days.

(21) Appl. No.: 15/287,476

(22) Filed: Oct. 6, 2016

(65) Prior Publication Data

US 2018/0103358 A1    Apr. 12, 2018

(51) Int. Cl.
| | | |
|---|---|---|
| *H04W 4/16* | (2009.01) | |
| *H04M 3/42* | (2006.01) | |
| *H04M 1/725* | (2006.01) | |
| *H04M 1/57* | (2006.01) | |

(Continued)

(52) U.S. Cl.
CPC ............ *H04W 4/16* (2013.01); *H04M 1/575* (2013.01); *H04M 1/64* (2013.01); *H04M 1/72519* (2013.01); *H04M 1/72547* (2013.01); *H04M 1/72583* (2013.01); *H04M 3/428* (2013.01); *H04M 3/42068* (2013.01); *H04M 3/42153* (2013.01); *H04M 2242/08* (2013.01)

(58) Field of Classification Search
CPC ......... H04W 4/16; H04M 1/575; H04M 1/64; H04M 1/72547; H04M 1/72583; H04M 3/42042; H04M 3/42068; H04M 3/4286
USPC ...................................................... 455/414.1
See application file for complete search history.

(56) References Cited

U.S. PATENT DOCUMENTS

| | | | |
|---|---|---|---|
| 5,323,444 A | 6/1994 | Ertz et al. | |
| 6,519,335 B1 * | 2/2003 | Bushnell | H04M 1/663 |
| | | | 379/208.01 |
| 7,986,978 B2 | 7/2011 | Katoh et al. | |

(Continued)

FOREIGN PATENT DOCUMENTS

| | | |
|---|---|---|
| KR | 101152023 | 6/2012 |
| KR | 20120106433 | 9/2012 |

(Continued)

OTHER PUBLICATIONS

PCT Search Report and Written Opinion dated Nov. 30, 2017 for PCT Application No. PCT/US17/53304, 12 pages.

(Continued)

*Primary Examiner* — Charles N Appiah
*Assistant Examiner* — Nicole M Louis-Fils
(74) *Attorney, Agent, or Firm* — Lee & Hayes, P.C.

(57) ABSTRACT

In a multi-call scenario, a UE can receive an incoming call while an active call is already established on the UE. In response to receiving the incoming call, a process for handling the incoming call in a user-customizable manner can include accessing a history of user input received by the UE in context of handling multiple contemporaneous calls on the UE, and handling the incoming call based at least in part on the history of the user input. By the UE considering past user input received by the UE in context of handling multiple contemporaneous calls, the UE is configured to learn from past user behavior during multi-call scenarios, and adjust its call handling approach for the incoming call based on the past user behavior.

20 Claims, 6 Drawing Sheets

(51) Int. Cl.
*H04M 1/64* (2006.01)
*H04M 3/428* (2006.01)

(56) References Cited

U.S. PATENT DOCUMENTS

| | | | |
|---|---|---|---|
| 8,090,087 B2 | 1/2012 | Jobs et al. | |
| 8,249,564 B2 | 8/2012 | Chung | |
| 9,584,653 B1* | 2/2017 | Lyren | H04M 1/72583 |
| 2002/0077158 A1* | 6/2002 | Scott | H04M 1/663 |
| | | | 455/567 |
| 2004/0116103 A1 | 6/2004 | Kurihara | |
| 2007/0142047 A1* | 6/2007 | Heeschen | H04W 68/12 |
| | | | 455/435.1 |
| 2009/0279683 A1* | 11/2009 | Gisby | H04M 3/42263 |
| | | | 379/201.02 |
| 2011/0111735 A1* | 5/2011 | Pietrow | H04M 1/642 |
| | | | 455/414.1 |
| 2013/0029645 A1* | 1/2013 | Schentrup | H04M 1/274583 |
| | | | 455/414.1 |
| 2015/0195393 A1* | 7/2015 | Sinha | H04M 1/6066 |
| | | | 455/414.1 |
| 2015/0271216 A1* | 9/2015 | Mathias | H04L 65/1073 |
| | | | 370/270 |
| 2018/0032997 A1* | 2/2018 | Gordon | G06Q 20/3224 |

FOREIGN PATENT DOCUMENTS

| | | |
|---|---|---|
| KR | 20140036619 | 3/2014 |
| KR | 101397941 | 5/2014 |

OTHER PUBLICATIONS

The Extended European Search Report dated Dec. 2, 2019 for European Patent Application No. 17858906.5, 6 pages.

* cited by examiner

USER CUSTOMIZABLE HANDLING OF MULTIPLE CALLS

BACKGROUND

Current user equipment (UE) (e.g., mobile phones) can establish up to two calls at the same time by having one active call and another call on hold. Handling more than two calls (i.e., a third incoming call) at the same time creates an issue because current UEs are not capable of establishing all three calls at the same time without a conference bridge. Thus, a UE that receives a third incoming call provides limited options for handling the third incoming call. Some UEs simply reject the third incoming call without giving a user an option to answer the third incoming call. However, not giving a user the chance to answer an incoming call is unacceptable from a customer service standpoint. Other UEs are configured to give the user an option to answer the third incoming call, but the options provided to the user are limited.

For example, the user can be given the option to answer or reject the third incoming call, sometimes along with a preconfigured text message that is sent to the rejected third caller. When answering the third incoming call, the user must choose between dropping either a first active call or a second call that is either incoming or on hold. These limited options are also not acceptable from a customer service standpoint. For example, a caller of an "on-hold" call that was dropped to answer an incoming call in the above scenario may be left wondering why his/her call was dropped; the caller not having had a chance to talk to the user on the other end before the on-hold call was dropped. Furthermore, the system-generated text messages that are sent to rejected callers are often unacceptable as either lacking desired formalities for business relationships, being too formal for personal relationships, or otherwise not "sounding like" the user that sent the message.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
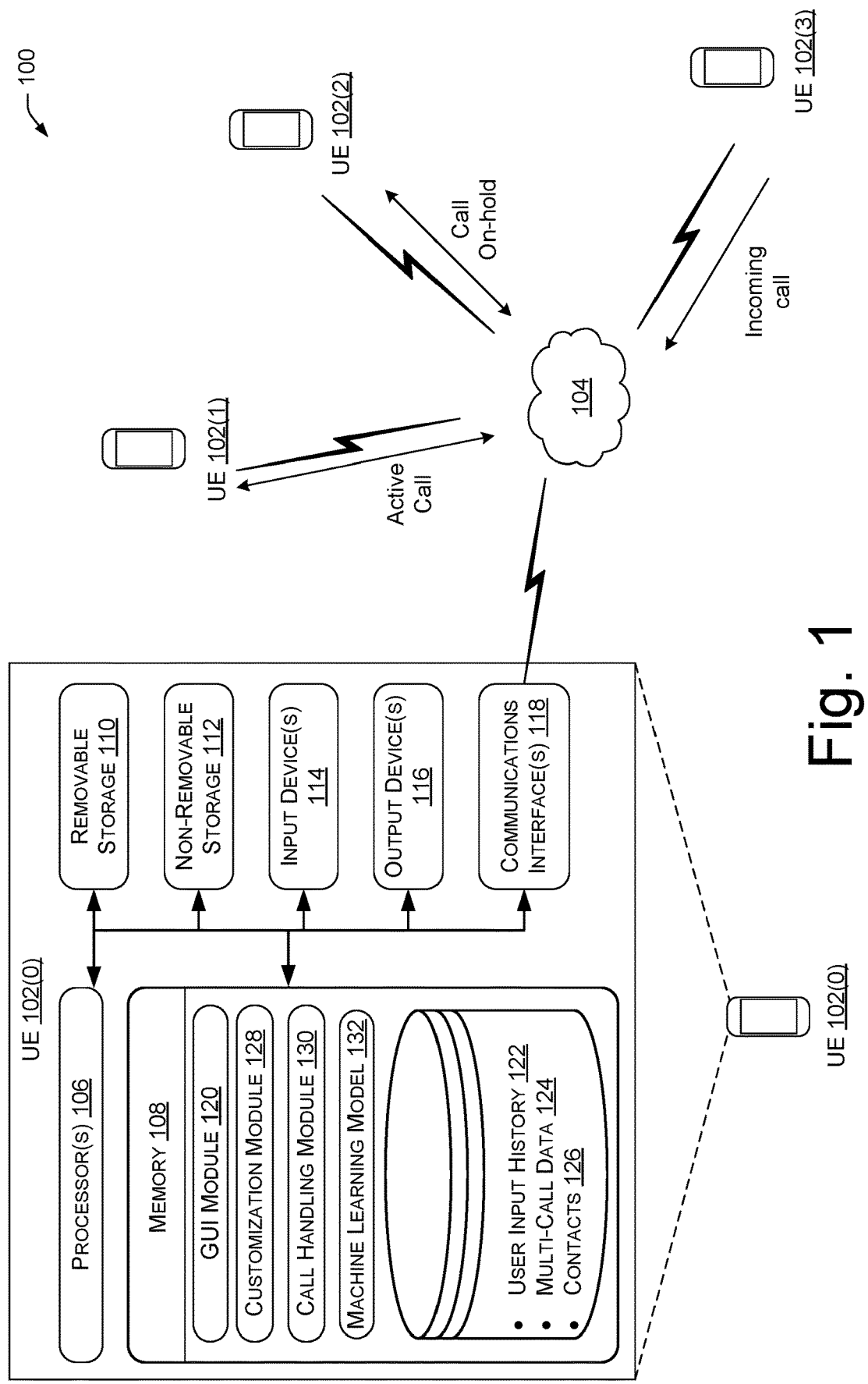
FIG. 1 is an example networked computer environment showing a block diagram of an example UE with a user customizable call handling module.

Described herein are techniques and systems for user customizable handling of multiple contemporaneous calls. In a multi-call scenario, a UE can receive an incoming call while an active call is already established on the UE. In a "three-call" version of a multi-call scenario, the UE can have an additional call on hold, or can receive an additional incoming call. Regardless of the number calls, in any multi-call scenario, a process for handling the incoming call in a user-customizable manner can include accessing a history of user input received by the UE in context of handling multiple contemporaneous calls on the UE, and handling the incoming call based at least in part on the history of the user input. By the UE considering past user input received by the UE in context of handling multiple contemporaneous calls, the UE is configured to learn from past user behavior during multi-call scenarios, and adjust its call handling approach for the incoming call based on the past user behavior.

The UE is configured to customize how the incoming call is handled to the user in various ways, including, without limitation, determining whether to automatically reject or drop an individual call based on past user behavior in context of handling multiple contemporaneous calls, suggesting a customized message that is to be sent to a rejected or dropped caller based on past messages typed or selected by the user in past multi-call scenarios, and/or presenting a customized set of selectable options for handling the incoming call on a display of the UE based on options previously selected by the user in past multi-call scenarios.

Also disclosed herein are systems and devices comprising one or more processors and one or more memories, as well as non-transitory computer-readable media storing computer-executable instructions that, when executed, by one or more processors perform various acts and/or processes disclosed herein.

The systems and techniques described herein improve customer experience for users involved with a call session in multiple ways. For example, automated call handling actions can be customized to the user (e.g., actions the system infers are acceptable based on past user behavior in context of handling multiple contemporaneous calls). In addition, customized options for handling an incoming call and/or customized messaging can be provided to the user for selection in context of handling multiple contemporaneous calls. These various customizations streamline the call handling process in a multi-call scenario. For example, if the user is presented with fewer, but personalized (or customized), options for handling an incoming call in a multi-call scenario, the user can make a quicker selection without thinking about whether the option is going to be acceptable for his/her situation. Automated call handling actions taken on behalf of the user streamline the process even more by eliminating user input. In addition, callers that are dropped and/or rejected in a multi-call handling processes can receive messages that "sound more like" the user on the other end of the call because the messaging is customized to the user based on past messaging behavior of the user in other multi-call scenarios. Transmitting messages to dropped or rejected callers, in general, provides more information to the dropped or rejected callers as to why their call was dropped or rejected. These features individually, and in combination, result in an improved call experience.

FIG. 1 is an example networked computer environment 100 showing a block diagram of an example UE 102(0) with a user customizable call handling module. In accordance with various embodiments described herein, the terms "user equipment (UE)," "wireless communication device," "wireless device," "communication device," "mobile device," and "client device," may be used interchangeably herein to describe any UE (e.g., the UE 102(0)) that is capable of transmitting/receiving data using any suitable wired or wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

The UE 102(0) may be implemented as any suitable type of computing device configured to communicate over a computer network 104, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an in-vehicle (e.g., in-car) computer, and/or any similar mobile device, as well as situated computing devices including, without limitation, a television (smart television), set-top-box (STB), game console, desktop computer, and the like.

As shown, the UE 102(0) may include one or more processors 106 and one or more forms of computer-readable memory 108. The UE 102(0) may also include additional storage devices. Such additional storage may include removable storage 110 and/or non-removable storage 112. In various embodiments, the computer-readable memory 108 comprises non-transitory computer-readable memory 108 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 108 may also be described as computer storage media and may include volatile and nonvolatile, removable and non-removable media implemented in any method or technology for storage of information, such as computer readable instructions, data structures, program modules, or other data. Computer-readable memory 108, removable storage 110 and non-removable storage 112 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 102(0). Any such computer-readable storage media may be part of the UE 102(0).

The UE 102(0) may further include input devices 114 communicatively coupled to the processor(s) 106 and the computer-readable memory 108. The input device(s) 114 can include, without limitation, a camera, a microphone, a keyboard/keypad, a touch screen (or touch-sensitive display), and the like.

The UE 102(0) may further include output devices 116 communicatively coupled to the processor(s) 106 and the computer-readable memory 108. The output device(s) 116 can include, without limitation, a display, speakers, a tactile feedback mechanism, a printer, and the like.

The UE 102(0) may further include communications interface(s) 118 that allow the UE 102(0) to communicate with other computing devices (e.g., nodes of the computer network 104, other UEs 102, etc.). The communications interface(s) 118 may facilitate transmitting and receiving wired and/or wireless signals over any suitable communications/data technology, standard, or protocol, as described herein. For example, the communications interface(s) 118 can comprise one or more of a cellular radio, a wireless (e.g., IEEE 802.1x-based) interface, a Bluetooth® interface, a wired modem or Ethernet port, and so on. The communications interface(s) 118 may further enable the UE 102(0) to communicate over circuit-switch domains and/or packet-switch domains.

In general, a user can utilize the UE 102(0) to communicate with other users and associated UEs 102 (e.g., the UE 102(1), the UE 102(2), and the UE 102(3) of FIG. 1) via the computer network 104. The computer network 104 can represent any suitable type of network, or combination of networks, including radio access networks (RANs), an Internet Protocol Multimedia Subsystem (IMS) network, (sometimes referred to as the "IMS core network," the "IMS core," the "IMS network," the "Core Network (CN)," or the "IM CN Subsystem"), the Internet, and/or any public or private network and related network hardware involved in the various wired and/or wireless communications and protocols described herein. The computer network 104 (which may include an IMS network) allows for peer-to-peer communications, as well as client-to-server communications over an IP-based network. When the computer network 104 includes an IMS network, the IMS network can be maintained and/or operated by one or more service providers, such as one or more wireless carriers ("operators"), that provide IMS-based services to users (sometimes called "subscribers") who are associated with the UEs 102. For example, a service provider may offer multimedia telephony services, among other services, that allow a subscribed user to call or message other users via the computer network 104 (including the IMS network) using his/her UE 102. In order to access these services (e.g., telephony services), a UE 102 is configured to request establishment of a communication session. In the case of telephony services, the communication session can comprise a call (e.g., a voice-based communication session, such as a VoLTE call). The computer network 104 can also support circuit switched (CS) calling when circuit switched networks are available.

With reference to FIG. 1, there are situations when the UE 102(0) may receive multiple contemporaneous calls from other UEs 102. This may often be the case for popular individuals, or business users that use their UE 102(0) for business purposes as well as personal use. For example, FIG. 1 shows that the UE 102(0) can establish an active call with a first UE 102(1). In order to establish a call, one of the UEs 102(0) or 102(1) can send a session request in the form of a Session Initiation Protocol (SIP) message using the SIP INVITE method via the computer network 104 to the other UE 102. SIP is a signaling protocol that can be used to establish, modify, and terminate multimedia sessions (e.g., a multimedia telephony call) over packet networks, and to authenticate access to IMS-based services. Once setup and authentication procedures are completed, a first call between callers of the UE 102(0) and the UE 102(1) can be considered a first active call established on the UE 102(0).

FIG. 1 also shows an example where the UE 102(0) has established and placed a second call on-hold with a second UE 102(2). The second call with the UE 102(2) that is "on-hold" with the UE 102(0) may have been established before or after the establishment of the first active call with the first UE 102(1).

FIG. 1 further shows that the UE 102(0) can receive a third incoming call from a third UE 102(3) while the first active call (i.e., the call with the first UE 102(1)) is already established on the UE 102(0) and while the second call (i.e., the call with the second UE 102(2)) is on hold with the UE 102(0). This example shown in FIG. 1 is an example of a "three-call" scenario where the UE 102(0) is tasked with handling three contemporaneous calls. "Contemporaneous" is used herein to denote calls that are either established, or requesting establishment, with the UE 102(0) in the same period of time. For example, each of the three UEs 102(1), 102(2), and 102(3) may have sent SIP INVITES to the UE 102(0) at different times to request establishment of respective calls with the UE 102(0). However, during a given period of time, the three calls can be considered "contemporaneous" if all of the calls are either established or in the process of being established (e.g., incoming, being setup, and the like) at the same time.

It is to be appreciated that, although FIG. 1 depicts single UEs 102 involved on either end of the individual calls (e.g., the active call, the call on-hold, and the incoming call), any individual calls can represent a conference call where a conference bridge is established to connect multiple parties, rather than connecting two parties via non-conferencing technologies. Furthermore, it is to be appreciated that different three-call scenarios can occur than the example three call scenario shown in FIG. 1. For example, another three-call scenario can occur when the UE 102(0) receives a third incoming call from the UE 102(3) while a first active call is already established with the UE 102(1) and while a second call from the UE 102(2) is incoming (as opposed to the second call being on-hold).

In addition, a "two-call" scenario can occur when the second call from with the UE 102(2) is omitted, and when the UE 102(0) receives the incoming call from the UE 102(3) while the first active call from the UE 102(1) is already established. The techniques and systems described herein are equally applicable in any multi-call scenario involving any number of contemporaneous calls, including two, three, or more contemporaneous calls.

The computer-readable memory 108 is shown as including various modules and data that, when executed by the one or more processors 106, can implement the various techniques and processes described herein. The memory 108 can include a GUI module 120 that is at least configured to present, on a display of the UE 102(0), a set of selectable options for call handling in multi-call scenarios. For example, the GUI module 120 can be configured to present selectable options on the display of the UE 102(0) in the form of tabbed screens, a list of soft buttons, or any similar interactive GUI elements, for selection by a user to provide user input (via a touch sensitive display of the UE 102(0)) in context of handling multiple contemporaneous calls on the UE 102(0) (e.g., See FIG. 2, described below in more detail). The user can provide user input on the display of the UE 102(0) by selecting a particular selectable option for handling an incoming call in a multi-call scenario. Such user input received in a multi-call scenario is considered to be user input that is received in context of handling multiple contemporaneous calls on the UE 102(0).

As this user input is received by the GUI module 120 in context of handling an incoming call in a multi-call scenario, the received user input is stored in the memory 108 as part of a history of user input 122 (denoted as "user input history 122" in FIG. 1). Over time, the history of user input 122 received in context of multi-call scenarios grows to reflect user input behavior on multiple occasions (or instances) during a multi-call scenario.

The UE 102(0) can also store multi-call data 124 (or "data pertaining to multiple contemporaneous calls 124") in the memory 108 of the UE 102(0) as multi-call scenarios occur at the UE 102(0). This multi-call data 124 can include, without limitation, contact names associated with the individual calls in a multi-call scenario, as well as phone numbers, call type designators associated with the individual calls, times at which the individual calls were received at the UE 102(0), and other characteristics and/or information associated with the incoming and established calls involved in the multi-call scenarios.

The memory 108 of the UE 102(0) is also shown as storing a list of contacts 126. Individual contacts 126 can include a phone number, a contact name, and a designated classification, such as designated classes including business contact, personal contact, schoolmate, colleague, or any other type of class. When a user of the UE 102(0) stores a phone number as a contact 126, the user can designate the contact as any of the types of classes described herein, or any other similar type of class designator. These class designators can be used to associate a call type designator with an incoming call from one of the contacts 126.

In addition to contacts 126 representative of people other than the owner of the UE 102(0), the contacts 126 can further include contact information of the owner (user) of the UE 102(0) himself/herself. The memory 108 can therefore maintain one or more phone numbers for the UE 102(0) that are associated with the owner of the UE 102(0), such as a first phone number for personal use, and a second phone number for business use, and so on. In this manner, an owner of the UE 102(0) can use the UE 102(0) for different purposes (e.g., a personal UE, a business UE, etc.).

The memory 108 of the UE 102(0) can further include a customization module 128 for customizing settings pertaining to the handling of an incoming call in a multi-call scenario. For example, the customization module 128 can allow a user (via a settings menu or the like) to specify, and save, various preferences in relation to handling multiple contemporaneous calls. The UE 102(0) can come with "out-of-the-box" settings for handling multiple contemporaneous calls.

Figure 2:
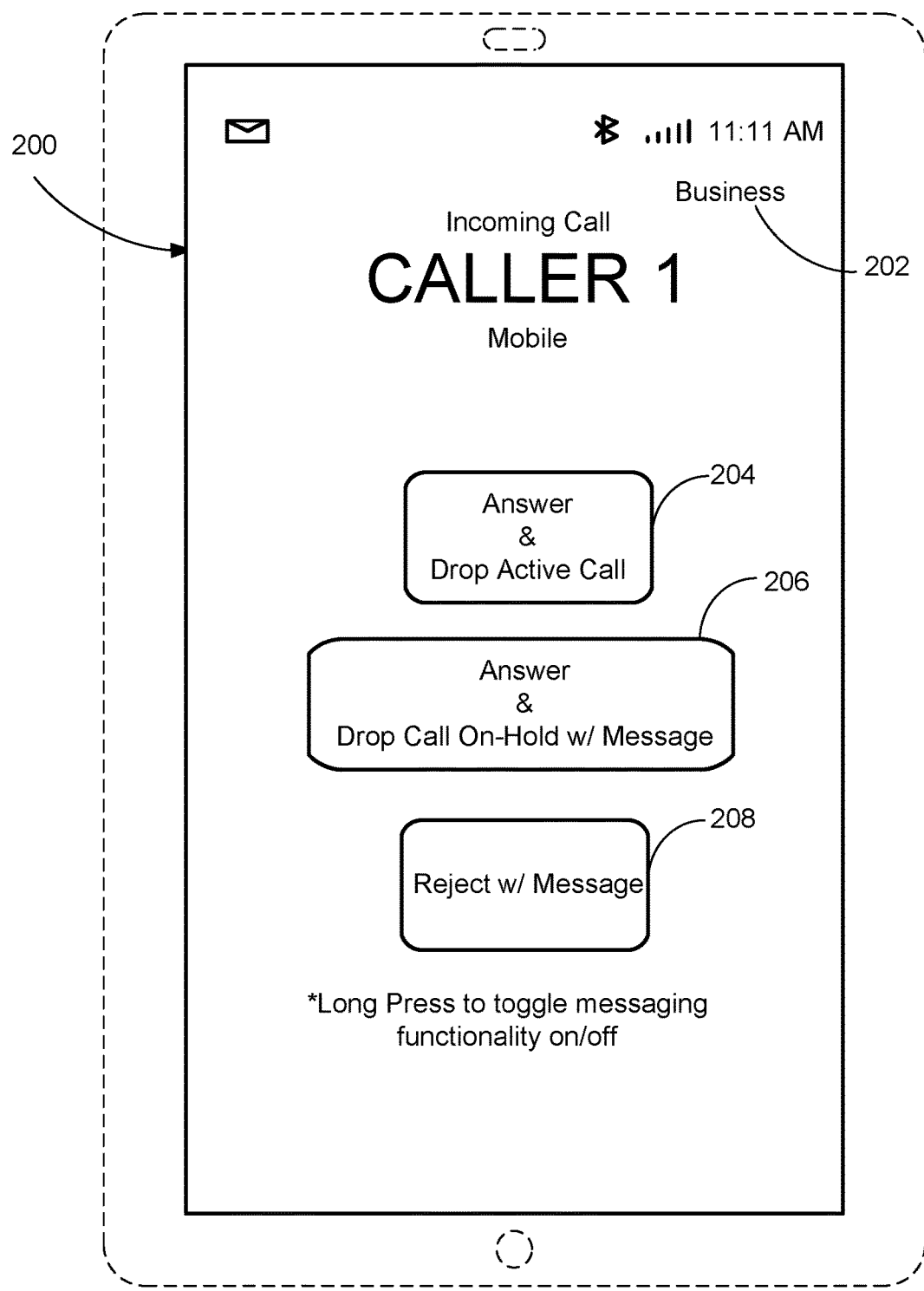
FIG. 2 illustrates an example graphical user interface (GUI) for handling an incoming call during a multi-call scenario.

Accordingly, a call handling module 130 for an "out-of-the-box" UE 102(0) without any user customization is configured to handle an incoming call in a multi-call scenario by presenting, on the display of the UE 102(0) via the GUI module 120, a set of selectable options for handling the incoming call. With reference to FIG. 2, and continuing with the example multi-call scenario of FIG. 1, FIG. 2 shows an example GUI 200 for handling an incoming call during a multi-call scenario. The incoming call of FIG. 2 is shown as having a call type designator 202, such as "business" to indicate to the user that Caller 1 is a business contact. In response to the incoming call during a multi-call scenario, the GUI module 120 may receive instructions from the call handling module 130 to present a default set of selectable options on a display of the UE 102(0) for selection by the user. The default set of selectable options can comprise the following: (i) a first selectable option 204 to answer the third incoming call and drop the first active call, (ii) a second selectable option 206 to answer the third incoming call, drop the second call on hold, and send a message to the second UE 102(2) associated with the second call on hold, and (iii) a third selectable option 208 to reject the third incoming call and send a message to the third UE 102(3) associated with the third incoming call. Sending messages to dropped or rejected callers is useful when the user of the UE 102(0) does not have a chance to inform those callers that he/she is dropping or rejecting their calls. Accordingly, a message can be sent with the second option 206 and the third option 208. FIG. 2 shows an example where first option 204 may not involve sending a message to the caller of the active call because the user of the UE 102(0) can, instead, inform the active caller that he/she is about to drop the active call to answer the third incoming call. However, messages can be sent in all three options as an alternative.

In some embodiments, the user can select the option by touching the touch-sensitive display to accept the selected option as is. In some embodiments, messaging functionality can be toggled on and off with a gestural input, such as a "long press" (i.e., a press and hold for greater than a threshold amount of time). For example, if the user of the UE 102(0) wants to reject the third incoming call from the UE 102(3) without sending a message to the rejected third caller, he/she can press and hold the third option 208, which will reject the incoming call without sending a message to the UE 102(3). Alternatively, selectable options for rejecting or dropping a call without sending a message to the rejected or dropped caller can be presented, and a long press or similar gesture received on the display can toggle messaging functionality "on" so that a message is sent to the rejected or dropped caller when that option is selected. For example, a long press received on the first option 204 can drop the active call and send a message to the active caller. Toggling messaging functionality with a long press or similar gesture (e.g., double tap) allows for reducing the number of options presented on the display of the UE 102(0) to make it easier for the user to process the available options during a time sensitive situation where the user is to decide how to handle the incoming call.

Where messages are to be sent to dropped or rejected callers, the system may provide a default message for use with such options (e.g., "sorry, I have to drop the call"). Additionally, or alternatively, the user of the UE 102(0) can be provided a text field to enter a text message in real-time when an option is selected where a message is to be sent to the dropped or rejected caller, such as the second option 206 or the third option 208 of FIG. 2.

It is to be appreciated that contact names can be utilized with the selectable options 204-208 instead of presenting a description of the call in question. For example, the first option 204 can be presented as "answer Jim and drop Brian", or something similar based on the contacts 126 available to the call handling module 130. The contact name for a given call can be determined from information in message headers (e.g., a SIP header), such as a phone number that is correlated with a phone number in the contacts 126 upon receiving an incoming call at the UE 102(0).

Of course, other types of selectable options can be presented on the display of the UE 102(0) as a default set of selectable options, and default sets of selectable options, and messages, can be customized (changed) by the user via the customization module 128. For example, the aforementioned "long-press" gesture for toggling messaging functionality can be omitted, and more selectable options can be presented, such as: (i) a first option to answer the third incoming call and drop the first active call, (ii) a second option to answer the third incoming call and drop the second call on hold, (iii) a third option to answer the third incoming call, drop the second call on hold, and send a message to the second UE 102(2) associated with the second call on hold, (iv) a fourth option to reject the third incoming call, and (v) a fifth option to reject the third incoming call and send a message to the third UE 102(3) associated with the third incoming call. Other variations are possible.

Furthermore, in a "two-call" scenario, a default set of selectable options presented on the display of the UE 102(0) can include: (i) a first option to answer the incoming call and drop the active call, and (ii) a second option to reject the incoming call. Again, messaging functionality can be toggled via gestural user input in the two-call scenario, such as a long press, double tap, and the like, received on any individual selectable option. Furthermore, the default options can include sending a message to the dropped or rejected caller, or the default options may not include sending a message to the rejected or dropped caller. Another example set of selectable options in the "two-call" scenario can include: (i) a first option to answer the incoming call and put the active call on hold, (ii) a second option to answer the incoming call and drop the active call, and (iii) a third option to reject the incoming call. Other variations are possible.

Whatever the default set of selectable options are, and whatever the default messages the system provides out-of-the-box, the customization module 128 can allow the user to customize these features. For example, the user can choose a preferred message from a list (e.g., drop down list) of predetermined messages to use as a message that is sent to a dropped or rejected caller. Alternatively, the user can create his/her own custom message and save the message for later use when a message is to be sent to a dropped or rejected caller. The user-selected (or user-created) message received by the customization module 128 can be globally applied to all callers, or the user can assign the custom message to a particular class (e.g., business contact, personal contact, schoolmate, colleague, or any other type of class designator), or to a particular phone number (e.g., a first phone number that is a business phone number of the UE 102(0), a second phone number that is a personal phone number of the UE 102(0), etc.). This type of message customization may allow the user to be more formal with business colleagues, and more casual with personal contacts. It also allows the user to write (or select) messages that "sound more like" the user because they are written (or selected) by the user.

When messages are customized via the customization module 128, these custom messages can used with a selectable option in a set of selectable options, such as the selectable options 206 and 208 shown in FIG. 2. For example, the user selects the second option 206 of FIG. 2 in a multi-call scenario, the message selected for sending to the second UE 102(2) can comprise a user-customized message (previously selected or written by the user via the customization module 128) that is either globally applied to all users, or assigned to a class of users of which the caller of the second call is a member, or the message may have been assigned to a phone number of the UE 102(0) that the second call is connected with.

Furthermore, when custom sets of selectable options are specified by the user via the customization module 128, those sets of selectable options can be presented in a multi-call scenario. For example, the user may prefer to be presented with selectable options that do not include sending messages to users and with messaging functionality toggled on by a gestural input, or vice versa.

As noted above, the call handling module 130 is configured to present, on the display of the UE 102(0), selectable options for handling an incoming call in a multi-call scenario, such as the selectable options 204-208 of FIG. 2. Over time, as multi-call scenarios occur, and as the user input history 122 and the multi-call data 124 is populated with user input and data regarding multiple contemporaneous calls, the call handling module 130 is configured to access the user input history 122 to determine how to handle an incoming call in a user-customizable manner during a multi-call scenario. For example, the call handling module 130 can determine, from the user input history 122, messages that have been typed or selected in the past for rejecting incoming calls and/or dropping calls on hold, as well as a frequency at which these messages were selected or typed. As another example, the user input history 122 can indicate particular options from a set of selectable options (e.g., the options 204-208 of FIG. 2) that have been selected in the past during multi-call scenarios, and the call handling module 130 can determine which options have been selected, a frequency at which the options have been selected, and the like. In some embodiments, the call handling module 130 can implemented automated actions on behalf of the user based on the user input history 122. For example, if the user has rejected incoming calls from a particular contact or class of contacts in past multi-call scenarios more than a threshold number of times, the call handling module 130 can infer a user preference for this behavior and can take future automated actions on behalf of the user that is aligned with this preference.

FIG. 1 also shows a machine learning model 132 that is stored in the memory 108 of the UE 102(0). The multi-call data 124 can be utilized as "training data" in order to train the machine learning model 132. For example, the multi-call data 124, as described herein, can include any suitable data pertaining to multiple contemporaneous calls that have been received on the UE 102(0), and this data can be labeled with the user input data in the user input history 122 for training the machine learning model 132. In other words, the machine learning model 132 can process data pertaining to a multi-call scenario that occurred in the past as an example, and can learn from the user input received during that multi-call scenario as a label on the training data so that the trained machine learning model 132 can process new data relating to a new multi-call scenario as input, and estimate or predict an output, where the output can comprise a call handling action (e.g., answering, rejecting, or dropping a call), a set of selectable options displayed on the display of the UE 102(0), or a message that is selected for sending to a dropped or rejected caller. Accordingly, the call handling module 130 can utilize the machine learning model to determine how to handle an incoming call in a multi-call scenario.

The machine learning model 132 can be implemented as any type of machine learning model. For example, suitable machine learning models for use with the techniques and systems described herein include, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of models whose outputs (predictions) are combined, such as by using weighted averaging or voting.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
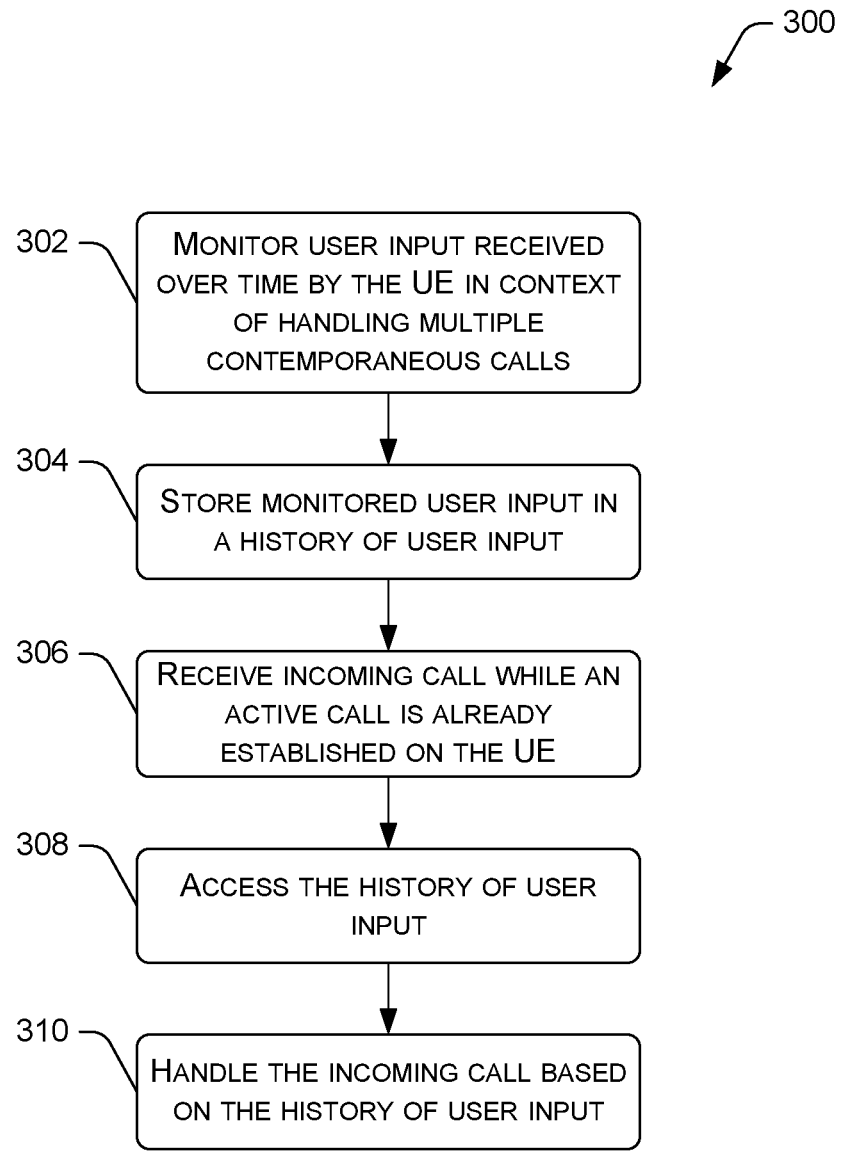
FIG. 3 illustrates a flowchart of an example process for handling an incoming call during a multi-call scenario in a user customizable manner.

FIG. 3 illustrates a flowchart of an example process 300 for handling an incoming call during a multi-call scenario in a user customizable manner. For discussion purposes, the process 300 is described with reference to the networked computer environment 100 of FIG. 1.

At 302, user input that is received by the UE 102(0) over time in the context of handling multiple contemporaneous calls can be monitored. For example, the GUI module 120 can receive and track user input received via the display of the UE 102(0) in regards to selectable options and messages selected or typed by the user during a multi-call scenario.

At 304, the call handling module 130 can store the user input received at 302 in the user input history 122. Accordingly, over time, as multi-call scenarios occur, user input regarding how the user chooses to handle an incoming call in a multi-call scenario can be tracked and stored in the user input history 122 to build up a history of user input in context of handling multiple contemporaneous calls at the UE 102(0). In addition to user input, data pertaining to the multiple contemporaneous calls (i.e., the multi-call data 124) can be stored in a similar manner as multi-call scenarios occur at the UE 102(0).

At 306, a new multi-call scenario can occur by the UE 102(0) receiving an incoming call while an active call is already established on the UE 102(0). Without additional calls, this is an example of a two-call scenario. However, the UE 102(0) can be handling the first active call and an additional call when the incoming call is received at 306 in a three-call scenario. The additional call can be another incoming call that was received just prior to the incoming call received at 306, or the additional call can be a call that is on hold with the UE 102(0) (as shown in the example of FIG. 1).

At 308, the call handling module 130 can access the history of user input 122 received by the UE 102(0) in context of handling multiple contemporaneous calls on the UE 102(0).

At 310, the call handling module 130 can handle the incoming call based at least in part on the history of the user input 122. In this manner, the history of user input 122 is considered in determining how to handle the incoming call. Various manners of handling the call at 310 are considered herein, and described in more detail with reference to at least the following figures.

Figure 4:
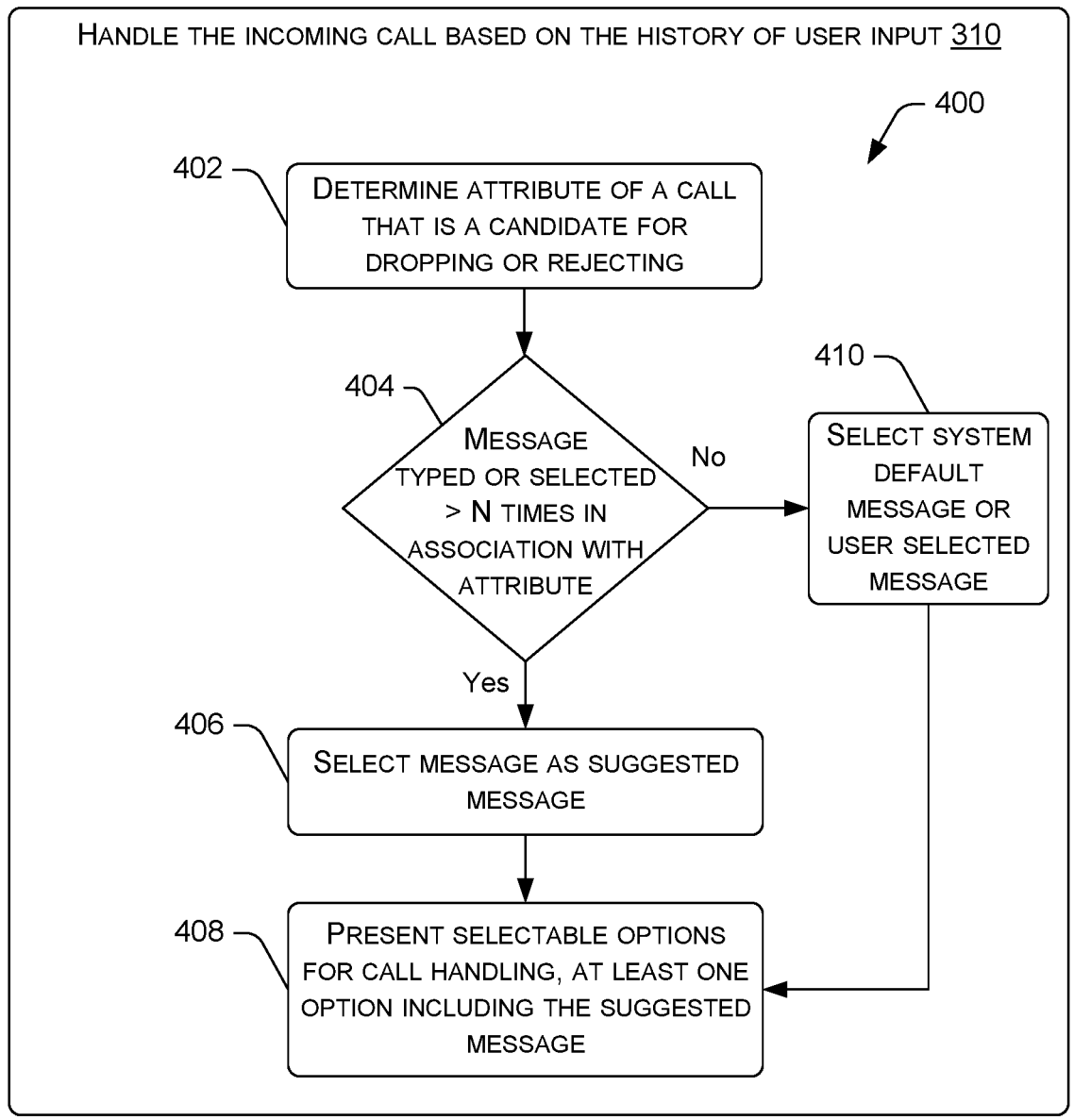
FIG. 4 illustrates a flowchart of an example process for handling an incoming call during a multi-call scenario by selecting a suggested message based on past user behavior.

FIG. 4 illustrates a flowchart of an example process 400 for handling an incoming call during a multi-call scenario by selecting a suggested message based on past user behavior. The process 400 can represent a sub-process of block 310 of the process 300. That is, the process 400 represents an example technique for handling an incoming call in a multi-call scenario based at least in part on a history of user input 122 received in context of handling multiple contemporaneous calls.

At 402, the call handling module 130 can determine an attribute of a call that is a candidate for dropping or rejecting in a multi-call scenario. In many cases, all calls being handled by the UE 102(0) are candidates for dropping or rejecting. At 402, the UE 102(0) can determine an attribute of an individual call, where the attribute can include, without limitation, a contact name of a caller (e.g., a contact name associated with any one of the UEs 102(1), 102(2), or 102(3) of FIG. 1), a call type designator (e.g., business, personal, etc.) associated with the individual call, or a phone number of the UE 102(0) that is associated with the call (e.g., a business phone number, a personal phone number, etc.).

At 404, the call handling module 130 can access the user input history 122 to determine one or more messages that have been typed or selected in the past for dropping or rejecting calls associated with the attribute determined at 402, and determine whether the message has been typed or selected more than a threshold number ("N") of times. For example, if the second, additional call on hold in a multi-call scenario is from a business contact (i.e., a "business" call type designator), the determination at 404 can include accessing the user input history 122 to determine a message typed or selected in the past for dropping calls from a business contact (i.e., calls associated with the "business" call type designator), and determining whether the number of times the message has been typed or selected in this context is greater than a threshold number of times (e.g., more than three times). The threshold number ("N") that is considered at 404 can vary by attribute. For example, if the attribute determined at 402 is a contact name of the call on hold in a multi-call scenario, the threshold at 404 can be N=0, meaning that the determination at 404 is to determine whether a message has been typed or selected at least once in the past for the same contact name. By contrast, the threshold could be set to a higher number for other attributes, like the call type designator attribute to determine with higher confidence that the user prefers a particular message for business contacts.

If it is determined that the message has been typed or selected more than a threshold number of times in association with the attribute (e.g., contact name of the caller, call type designator of the call, phone number of the UE 102(0) associated with the call, etc.), the process 400 follows the "yes" route from 404 to 406, where the message is selected as a suggested message for sending to the caller that is a candidate for dropping or rejecting.

At 408, the message is included in a selectable option among multiple selectable options that are presented, on the display of the UE 102(0) for handling the incoming call. For example, the GUI 200 can be presented at 408 with the message selected at 406 included as the suggested message in the second selectable option 206 of FIG. 2.

If it is determined at 404 that the message was not typed or selected more than a threshold number of times in association with the attribute determined at 402, the process 400 follows the "no" route to 410 where the call handling module 130 selects a different message, such as a default message or a user selected message that was previously saved in settings via the customization module 128, and proceeds to block 408 where the selectable options are presented with the message selected at 410. Thus, the process 400 is an example technique for allowing an incoming call to be handled in a user customizable manner based on past user input regarding messages that have been typed or selected in context of handling multiple contemporaneous calls.

Figure 5:
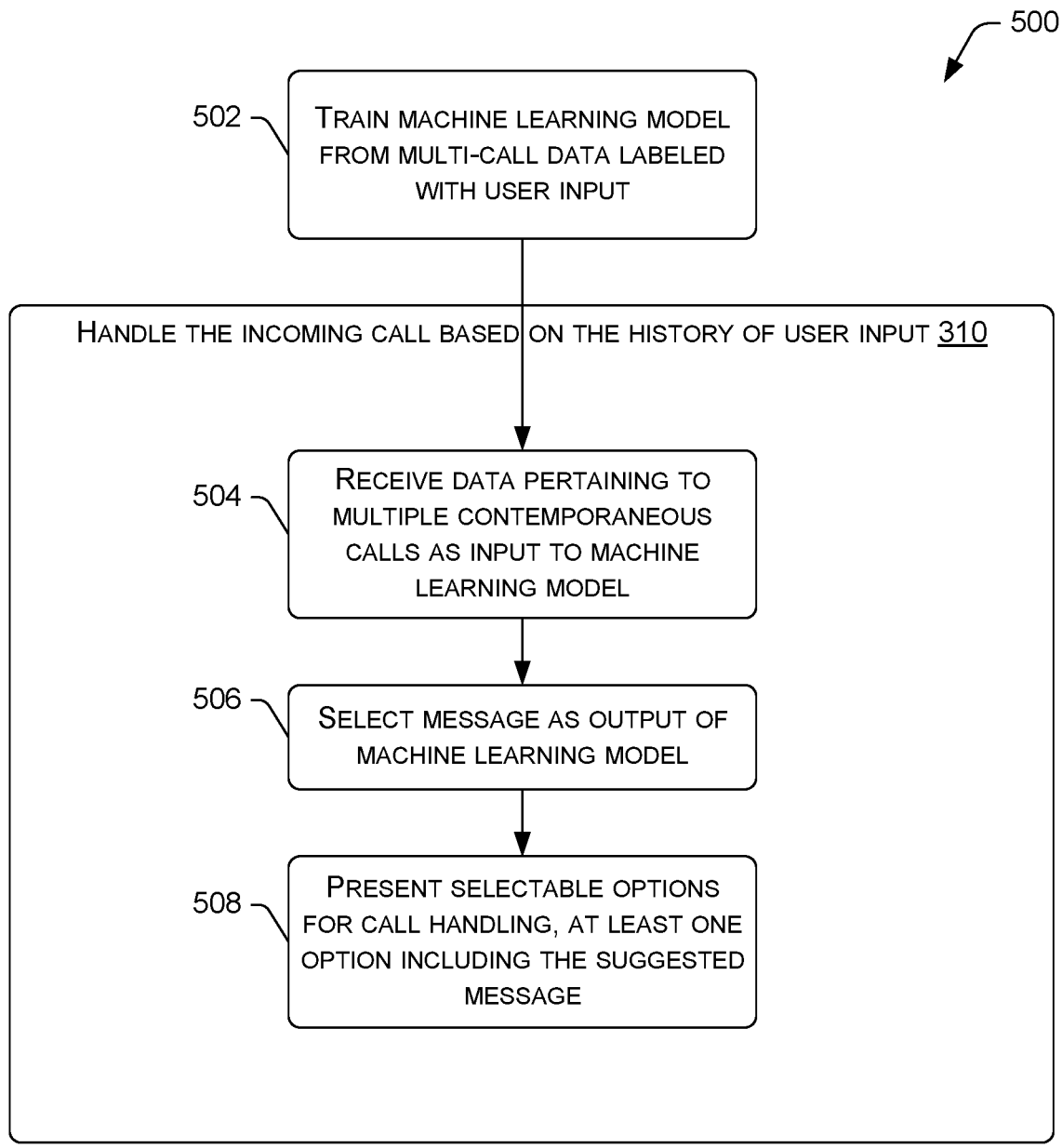
FIG. 5 illustrates a flowchart of an example process for handling an incoming call during a multi-call scenario by selecting a suggested message using a machine learning model trained on past user behavior.

FIG. 5 illustrates a flowchart of an example process 500 for handling an incoming call during a multi-call scenario by selecting a suggested message using a machine learning model trained on past user behavior. A portion of the process 500 can represent a sub-process of block 310 of the process 300. That is, a portion of the process 500 represents an example technique for handling an incoming call in a multi-call scenario based at least in part on a history of user input 122 received in context of handling multiple contemporaneous calls.

At 502, a machine learning model 132 can be trained on data 124 pertaining to multiple contemporaneous calls received in the past by the UE 102(0), the data 124 being labeled with the user input history 122 pertaining to those multiple contemporaneous calls. Once trained, the machine learning model 132 is configured to predict an output, such as a message that the user is likely to send to a caller of a rejected or a dropped call.

At 504, the call handling module 130 can receive data pertaining to multiple contemporaneous calls, and provide the data as input to the machine learning model 132. For example, the UE 102(0) can receive an incoming call while an active call is already established on the UE 102(0), and perhaps while an additional call is on hold with the UE 102(0). In this scenario, the data received at 504 and provided as input to the machine learning model 132 can be any suitable data described herein with respect to the multi-call data 124.

At 506, a message can be selected as output of the machine learning model. At 508, the message selected at 506 is included in a selectable option among multiple selectable options that are presented, on the display of the UE 102(0) for handling the incoming call. For example, the GUI 200 can be presented at 508 with the message selected at 506 included as the suggested message in the second selectable option 206 of FIG. 2.

Figure 6:
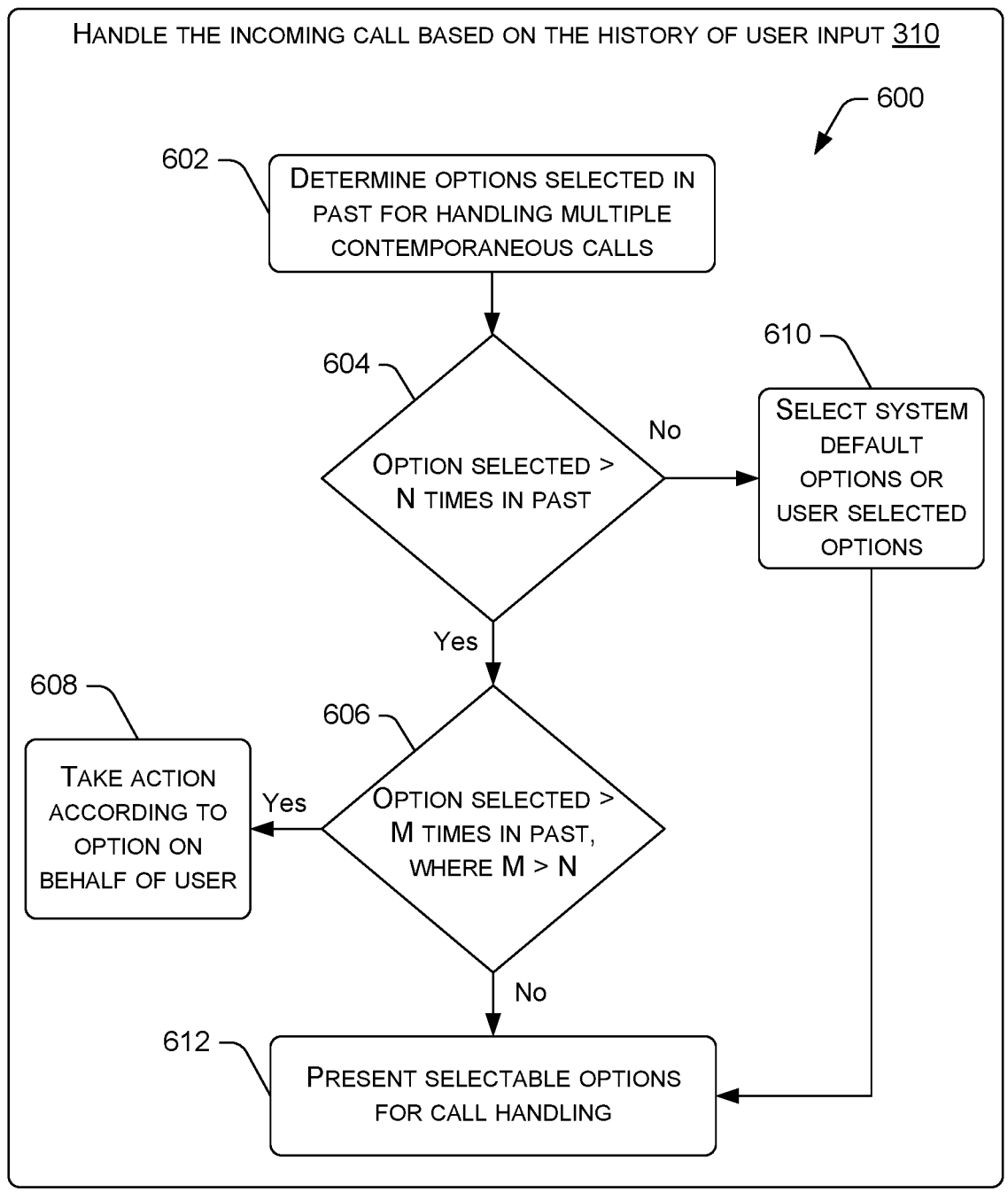
FIG. 6 illustrates a flowchart of an example process for handling an incoming call during a multi-call scenario by taking action on behalf of the user or presenting user customized call handling options based on past user behavior.

FIG. 6 illustrates a flowchart of an example process 600 for handling an incoming call during a multi-call scenario by taking action on behalf of the user or presenting user customized call handling options based on past user behavior. The process 600 can represent a sub-process of block 310 of the process 300. That is, the process 600 represents an example technique for handling an incoming call in a multi-call scenario based at least in part on a history of user input 122 received in context of handling multiple contemporaneous calls.

At 602, the call handling module 130 can determine selectable options (e.g., the options 204-208 of FIG. 2) that have been selected in the past for handling multiple contemporaneous calls.

At 604, a determination can be made as to whether a selectable option (e.g., answer and drop the call on hold) has been selected more than a first threshold number ("N") of times (e.g., more than 3 times). If it is determined at 604 that the selectable option has been selected more than the first threshold number of times, the process 600 proceeds down the "yes" route from 604 to 606 where it is determined whether the selectable option has been selected more than a second threshold number ("M") of times (e.g., more than 10 times) in the past in multi-call scenarios, where the second threshold number ("M") is greater than the first threshold number ("N").

If it is determined at 606 that the selectable option was selected more than the second threshold number ("M") times in the past, the process 600 follows the "yes" route from 606 to 608, where the call handling module 130 can take a call handling action on behalf of the user. For example, the call handling module 130, at 608, can automatically reject the incoming call in a multi-call scenario if the selectable option to reject the incoming call was selected more than the second threshold number ("M") of times in the past in other multi-call scenarios.

If it is determined at 604 that the selectable option has not been selected more than the first threshold number ("N") of times in the past, the process 600 follows the "no" route from 604 to 610, where the system selects a default set of selectable options, or a set of selectable options previously customized by the user, and presents those selectable options at 612. If, on the other hand, the determination at 604 is that the selectable option under consideration has been selected more than the first threshold number ("N") of times in the past, but less than the second threshold number ("M") of times at 606, the process 600 follows the "no" route from 606 to 612 where the selectable option is presented in the set of selectable options on the display of the UE 102(0).

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

I claim:

1. A user equipment (UE) comprising:
a processor; and
memory storing computer-executable instructions that, when executed by the processor, cause the UE to:
during one or more multiple call situations in which a first call is active as an active call, a second call is on hold as an on hold call, and a third call is incoming as an incoming call, display a default set of selectable options as displayed default options on a user interface of the UE, a first option among the displayed default options being selectable to answer the incoming call and drop the active call, a second option among displayed default options being selectable to answer the incoming call and drop the on hold call, a third option among the displayed default options being selectable to reject the incoming call;
maintain a history of user input received by the UE across the one or more multiple call situations, wherein the history of the user input indicates user selections of individual ones of the default set of selectable options during the one or more multiple call situations;
during a new multiple call situation, receive an incoming new third call as a new incoming call while an active new first call is already established as a new active call on the UE and while a new second call is on hold as a new on hold call with the UE;
access, in response to receipt of the new incoming call, the history of the user input; and
select and perform, in response to receipt of the new incoming call and based at least in part on the history of the user input, at least one of:
a first action to automatically reject or drop one call chosen from among the new active call, the new on hold call, and the new incoming call,
a second action to display a customized message as a suggested message to be sent to a device of a caller associated with the one call chosen from among the new active call, the new on hold call, and the new incoming call that is rejected or dropped, or
a third action to present, on the user interface of the UE, a customized set of selectable options that includes a smaller number of selectable options than the default set of selectable options,
wherein the computer-executable instructions cause the UE to perform the second action by:
determining an attribute of the new on hold call;
determining, based on the history of the user input, that during the one or more multiple call situations a particular message was typed or selected at least a threshold number of times when the incoming call had the attribute and was rejected based on selection of the third option or when the on hold call had the attribute and was dropped based on selection of the second option;
selecting the particular message as the customized message; and
presenting, on the user interface, a selectable option to answer the new incoming call, drop the new on hold call, and send the customized message to a second UE associated with the new on hold call.

2. The UE of claim 1, wherein:
the attribute of the new on hold call comprises a call type designator of the new on hold call, a contact name associated with the new on hold call, or a phone number of multiple phone numbers for the UE.

3. The UE of claim 1, wherein:
the memory maintains multi-call data about attributes of individual calls handled contemporaneously by the UE during the one or more multiple call situations;
the memory maintains a machine learning model that is trained on the multi-call data as labeled by the history of the user input; and
the computer-executable instructions cause the UE to perform the second action by:
determining the customized message as output of the machine learning model.

4. The UE of claim 1, wherein the computer-executable instructions cause the UE to perform the first action by:
determining, based on the history of the user input, that the third option to reject the incoming call was selected by a user during the one or more multiple call situations at least a threshold number of times; and
automatically rejecting the new incoming call based on the determination that the third option was selected during the one or more multiple call situations at least the threshold number of times.

5. A method comprising:
during one or more multiple call situations in which a first call is active, a second call is on hold or is incoming, and a third call is incoming, presenting a default set of options on a display of a user equipment (UE), a first option among the default set of options being selectable to answer the third call and drop the first call, a second option among the default set of options being selectable to answer the third call and drop the second call, a third option among the default set of options being selectable to reject the third call;
maintaining, by the UE, a history of user input received by the UE across the one or more multiple call situations, wherein the history of the user input indicates user selections of individual ones of the default set of options during the one or more multiple call situations;
during a new multiple call situation, receiving, by the UE, an incoming new third call while an active new first call is already established on the UE and while a new second call is incoming or on hold with the UE;
accessing, by the UE in response to receiving the incoming new third call, the history of the user input; and
selecting and performing, by the UE in response to receiving the incoming new third call and based at least in part on the history of the user input, at least one of:
a first action to automatically reject or drop one of the active new first call, the new second call, or the incoming new third call,
a second action to suggest a customized message to be sent to a device of a caller associated with the one of the active new first call, the new second call, or the incoming new third call that has been rejected or dropped, or
a third action to present, on the display of the UE, a customized set of selectable options that includes a smaller number of selectable options than the default set of options,
wherein performing the second action comprises:
determining, by the UE, an attribute of the new second call;
determining, by the UE based on the history of the user input, that during the one or more multiple call situations a particular message was typed or selected at least a threshold number of times when the third call had the attribute and was rejected based on selection of the third option or when the second call had the attribute and was dropped based on selection of the second option, the second option presented on the display adjacent to the third option;
selecting, by the UE, the particular message as the customized message; and
presenting, by the UE on the display of the UE, a selectable option to answer the incoming new third call, drop the new second call, and send the customized message to a second UE associated with the new second call.

6. The method of claim 5, wherein:
the attribute of the new second call comprises a call type designator of the new second call, a contact name associated with the new second call, or a phone number of multiple phone numbers for the UE.

7. The method of claim 5, wherein performing the second action comprises:
determining, by the UE, the customized message as output of a machine learning model that was trained on multi-call data about attributes of individual calls handled contemporaneously by the UE during the one or more multiple call situations, the multi-call data being labeled by the history of the user input in the machine learning model.

8. The method of claim 5, wherein performing the third action comprises:
determining, by the UE based on the history of the user input, that a particular one of the default set of options was selected by a user during the one or more multiple call situations at least a threshold number of times; and
wherein the customized set of selectable options includes the particular one of the default set of options.

9. The method of claim 5, wherein performing the first action comprises:
determining, by the UE based on the history of the user input, that the third option to reject the third call was selected by a user during the one or more multiple call situations at least a threshold number of times; and
automatically rejecting, by the UE, the incoming new third call based on the determination that the third option was selected during the one or more multiple call situations at least the threshold number of times.

10. One or more non-transitory computer-readable media storing computer-executable instructions that, when executed by one or more processors of a user equipment (UE), cause the one or more processors to perform operations comprising:
during one or more multiple call situations in which a first call is active, a second call is on hold or is incoming, and a third call is incoming, presenting a default set of options on a display of the UE, a first option among the default set of options being selectable to answer the third call and drop the first call, a second option among the default set of options being selectable to answer the third call and drop the second call, a third option among the default set of options being selectable to reject the third call;
maintaining a history of user input received by the UE across the one or more multiple call situations, wherein the history of the user input indicates user selections of individual ones of the default set of options during the one or more multiple call situations;
during a new multiple call situation, receiving an incoming new third call while an active new first call is already established on the UE and while a new second call is incoming or on hold with the UE;
accessing, in response to receiving the incoming new third call, the history of the user input; and
selecting and performing, in response to receiving the incoming new third call and based at least in part on the history of the user input, at least one of:
  a first action to automatically reject or drop one of the active new first call, the new second call, or the incoming new third call,
  a second action to suggest a customized message to be sent to a device of a caller associated with the one of the active new first call, the new second call, or the incoming new third call that has been rejected or dropped, or
  a third action to present, on the display of the UE, a customized set of selectable options that includes a smaller number of selectable options than the default set of options,
wherein performing the second action comprises:
  determining an attribute of the new second call;
  determining, based on the history of the user input, that during the one or more multiple call situations a particular message was typed or selected at least a threshold number of times when the third call had the attribute and was rejected based on selection of the third option or when the second call had the attribute and was dropped based on selection of the second option;
  selecting the particular message as the customized message; and
  presenting, on the display of the UE, a selectable option to answer the incoming new third call, drop the new second call, and send the customized message to a second UE associated with the new second call.

11. The one or more non-transitory computer-readable media of claim 10, wherein performing the third action comprises:
  determining, based on the history of the user input, that a particular one of the default set of options was selected by a user during the one or more multiple call situations at least a threshold number of times; and
  wherein the customized set of selectable options includes the particular one of the default set of options.

12. The one or more non-transitory computer-readable media of claim 10, wherein performing the first action comprises:
  determining, based on the history of the user input, that the third option to reject the third call was selected by a user during the one or more multiple call situations at least a threshold number of times; and
  automatically rejecting the incoming new third call based on the determination that the third option was selected during the one or more multiple call situations at least the threshold number of times.

13. The one or more non-transitory computer-readable media of claim 10, wherein the attribute of the new second call comprises a call type designator of the new second call, a contact name associated with the new second call, or a phone number of multiple phone numbers for the UE.

14. The one or more non-transitory computer-readable media of claim 10, wherein at least one of the second option and the third option includes a message option to send a text message to:
  a second UE associated with the second call when the second call is dropped based on selection of the second option, or
  a third UE associated with the third call when the third call is rejected based on selection of the third option, and
  wherein the second option is presented on the display adjacent to the third option.

15. The UE of claim 1, wherein the computer-executable instructions cause the UE to perform the third action by:
  determining, based on the history of the user input, that a particular one of the default set of selectable options was selected by a user during the one or more multiple call situations at least a threshold number of times; and
  wherein the customized set of selectable options includes the particular one of the default set of selectable options.

16. The UE of claim 1, wherein at least one of the second option and the third option includes a message option to send a text message to:
  a second UE associated with the second call when the second call is dropped based on selection of the second option, or
  a third UE associated with the third call when the third call is rejected based on selection of the third option.

17. The method of claim 5, wherein at least one of the second option and the third option includes a message option to send a text message to:
  a second UE associated with the second call when the second call is dropped based on selection of the second option, or
  a third UE associated with the third call when the third call is rejected based on selection of the third option.

18. The UE of claim 1, wherein, based on user input received by the UE as a long press to one of the displayed default options, the first option among the displayed default options is selectable to drop the active call without sending a message to a first caller associated with the first call, the second option among the displayed default options is selectable to drop the on hold call without sending a message to a second caller associated with the second call, or the third option among the displayed default options is selectable to reject the incoming call without sending a message to a third caller associated with the third call.

19. The method of claim 5, wherein, based on user input received by the UE as a long press to one of the default set of options, the first option among the default set of options is selectable to drop the first call without sending a message to a first caller associated with the first call, the second option among the default set of options is selectable to drop the second call without sending a message to a second caller associated with the second call, or the third option among the default set of options is selectable to reject the third call without sending a message to a third caller associated with the third call.

20. The one or more non-transitory computer-readable media of claim 10, wherein, based on user input received by the UE as a long press to one of the default set of options, the first option among the default set of options is selectable to drop the first call without sending a message to a first caller associated with the first call, the second option among the default set of options is selectable to drop the second call without sending a message to a second caller associated with the second call, or the third option among the default set of options is selectable to reject the third call without sending a message to a third caller associated with the third call.

* * * * *